United States Patent

[11] 3,616,224

[72] Inventors Isamu Shiio
Kamakura;
Shinichiro Otsuka, Yokohama; Shogo Kurasawa, Kawasaki; Ryosuke Uchio, Yokohama, all of Japan
[21] Appl. No. 748,970
[22] Filed July 31, 1968
[45] Patented Oct. 26, 1971
[73] Assignee Ajinomoto Co., Inc.
Tokyo, Japan
[32] Priority Aug. 5, 1967
[33] Japan
[31] 42/50233

[54] PRODUCTION OF AMINO ACIDS BY FERMENTATION
2 Claims, No Drawings

[52] U.S. Cl. .................................................... 195/49
[51] Int. Cl. ..................................................... C12d 13/06
[50] Field of Search............................................ 195/49, 29, 47

[56] References Cited
UNITED STATES PATENTS
3,222,258 12/1965 Iizuka et al. ................... 195/29
3,212,994 10/1965 Kono et al. ..................... 195/29

OTHER REFERENCES
Hayashi; O., Oxygenases, pp. 245– 247, Academic Press, N.Y., N.Y., 1962

*Primary Examiner*—A. Louis Monacell
*Assistant Examiner*—Seymour Rand
*Attorney*—Kurt Kelman

ABSTRACT: Two species of bacteria, *Achromobacter methanolophila* and *Pseudomonas insueta*, produce various amino acids in culture media containing methanol as the principal carbon source.

PRODUCTION OF AMINO ACIDS BY FERMENTATION

This invention relates to the biosynthesis of amino acids, and particularly to the synthesis of amino acids by fermentation.

Amino acids were prepared heretofore by culturing micro-organisms on culture media containing carbohydrates as the principal or only source of assimilable carbon. More recently, some micro-organisms capable of converting the carbon of hydrocarbons to amino acids have been found. Hydrocarbons, however, are insoluble in the aqueous base of the culture media employed, and special procedures are required for maintaining an interface of adequate magnitude between the aqueous and nonaqueous phases of such a culture medium.

It has now been found that certain bacteria produce amino acids when cultured aerobically on single-phase culture media free from hydrocarbons which contain methanol as the principal source of assimilable carbon. These bacteria are species of the genera Achromobacter and Pseudomonas. They have been named *Achromobacter methanolophilia* and *Pseudomonas insueta*, and several strains of each have been recovered from vegetables, fruits and soil samples.

They have the following characteristics:

*Achromobacter methanolophilia Nov. sp.*

Form of cell: (on 2 percent methanol nutrient agar slant at 30° C., after 18–24 hours) 0.4–0.6× 1.0–1.4. Rods, single or pairs. Nonmotile. Gram stain negative.

Relation to free oxygen: Aerobic 2 percent methanol nutrient agar colonies: Circular, smooth, entire in the edge, raised, glistening, opaque, grayish white or pale brownish gray, butyrous.

Methanol synthetic medium agar colonies: Circular, smooth, entire, flat or convex, glistening, white or pale brown, butyrous, media change occasionally to faint brownish color.

2 percent methanol nutrient agar slant: Growth moderate, filiform, glistening, opaque, grayish white.

Methanol synthetic medium agar slant: Growth moderate, filiform, glistening, opalescent, brownish gray.

Nutrient agar slant: Growth none.

2 percent methanol nutrient broth: Fragile pellicle and mycelial ring are formed. Slightly turbid.

Nutrient broth: Growth none.

Gelatin stab: No liquefaction.

Nitrate reduction: Nitrates are not usually reduced to nitrite in 2 percent methanol broth, but strains F-36-1 and F-73-1 are slightly positive.

Acid production: Acids are slowly produced from methanol but not produced from ethanol, glycerol, xylose, glucose, sucrose and lactose, in Hugh-Leifson's method.

Methanol is assimilable but ethanol, glucose, acetate, succinate and citrate are not assimilable as sole carbon source.

Optimum temperature: 25° to 30° C., scant growth or no growth at 42° C.

Habitat: Vegetables, fruits, soils.

The new species described above cannot be identified with any micro-organism found in Bergy's Manual of Determinative Bacteriology, 7th edition.

*Pseudomonas insueta nov. sp.*

Form of cells (on 2 percent methanol nutrient agar slant at 30° C., for 18–24 hours) 0.5×1.2–1.8. Rods, motile by means of polar flagella. Gram stain negative.

Relation to free oxygen: Aerobic 2 percent methanol nutrient agar colonies: Colony is small, circular, smooth, entire in the edge, raised, glistening, opalescent, pale yellowish gray, butyrous.

Methanol synthetic medium agar colonies: Growth poor.

2 percent methanol nutrient agar slant: Growth moderate, filiform, dull, opaque, grayish white.

Methanol synthetic medium agar slant: Growth moderate.

Nutrient agar slant: No growth.

2 percent methanol nutrient broth: Moderately turbid. Flocculent sediment.

Gelatin stab: No liquefaction.

Nitrate reduction: Nitrates are reduced to nitrite in 2 percent methanol broth.

Acid production: Acids are slowly produced from methanol, xylose, glucose, sucrose and lactose, but not from glycerol.

Methanol is assimilable but ethanol, glucose, acetate, succinate and citrate are not assimilable as sole carbon source.

Optimum temperature: Growth good at 25° to 30° C., poor or moderate at 37° C.

Habit: Soils, vegetables.

The species described above is characterized by not producing a red pigment whereas all known species capable of assimilating methanol produce red pigment. No micro-organism which can be identified with this species is found in Bergy's Manual of Determinative Bacteriology, 7th edition.

The methods used in part for the determination of the above characteristics are as follows:

1. Gelatin liquefaction

The cells were cultured in a nutrient agar medium containing 2 percent methanol and 0.4 percent gelatin for 9 days and the liquefaction was determined by Fraiger's method.

2. Assimilation

The cells were cultured in a medium containing 0.1% $K_2HPO_4$, 0.1% $NH_4NO_3$, 0.05% $MgSO_4$, 0.02% KCl and a single carbon source (pH 7.0) at 30° C. for 5 days.

3. Nitrate reduction

The cells were cultured in a nitrate broth medium (DIFCO) containing 2 percent of methanol at 30° C. for 9 days, and the medium was tested for nitrite after 1, 3, 5 and 7 days.

4. Methanol synthetic medium

| | |
|---|---|
| Methanol | 2% (by volume) |
| $(NH_4)_2SO_4$ | 5 g. |
| NaCl | 0.5 g. |
| $MgSO_4$ | 0.2 g. |
| $FeSO_4$ | 0.01 g. |
| $MnSO_4$ | 0.008 g. |
| $KH_2PO_4$ | 2 g. |
| yeast extract | 0.2 g. |
| distilled water | 1 l. |
| pH | 7.0 |

The several strains of the two species described above have been grown successfully on culture media whose source of assimilable carbon consisted essentially of methanol, but which contained conventional nitrogen sources, inorganic ions, and organic growth promotors. Methanol in high concentrations inhibits microbial growth, and the methanol is preferably added gradually during fermentation at the same rate at which it is consumed.

Ammonium salts, such as the chloride, sulfate or phosphate; soluble nitrates, such as those of potassium, sodium or ammonium; urea; and ammonia in the gaseous state or in aqueous solution may be used as nitrogen sources in the usual concentrations of 0.2 to 4 percent.

The usual amounts of inorganic ions should be present, such as $Fe^{++}$, $Mn^{++}$, $Cu^{++}$, $Zn^{++}$, $Mo^{++}$, also $MgSO_4$, $KH_2PO_4$ and $K_2HPO_4$. The yield of amino acids produced by fermentation is enhanced by vitamin $B_1$, biotine, panthotenic acid, vitamin $B_{12}$, and amino acids, such as methionine and cysteine; also natural products containing mixtures of amino acids, such as "Aji-eki," a commercial soybean protein hydrolysate, yeast extract, corn steep liquor, casein hydrolysate, and the like.

The new species of the invention are cultured aerobically at 20° to 40° C. for 1 to 3 days while the pH of the medium is held at 4 to 9. The hydrogen ion concentration rises substantially during fermentation because of the formation of amino acids and other organic acids from methanol, and also by consumption of ammonium salts if used as a nitrogen source. Phosphate buffers or calcium carbonate may be employed to maintain the desired pH value of the medium, but sodium hydroxide, ammonia, and other alkaline materials may be used as needed in the usual manner.

The amino acids accumulated in the broth by fermentation may be crystallized from the broth by adjusting the pH with or without prior removal of the microbial cells and partial evaporation of the water present, as is conventional, or they may be extracted from the liquor by means of ion exchange resins, as is well known.

The invention is further illustrated by the following examples of amino acid production from methanol as the principal carbon source. The following strains of the two new species were used:

| | |
|---|---|
| *Achromobacter methanolophilia* | F.54-1 |
| | F.54-2 |
| | F.48-3 |
| | F.36-1 |
| | F.70-1 |
| | E.95-1 |
| | E.91-1 |
| | E.19-2 |
| | F.73-1 |
| *Pseudomonas insueta* | G.8-3-2 |
| | G.4-1-2 |
| | F.27-3 |

No strains of either species were found which would not produce significant amounts of amino acids when cultured on methanol containing media.

*A. methanolophilia* F.54-2 is available from the Fermentation Research Institute, Agency of Industrial Science and Technology, Chiba, Japan, as FERM No. 83, and also from the American Type Culture Collection as ATCC 21275. *P. insueta* G.8-3-2 is similarly available as FERM No. 84 or ATCC 21276.

EXAMPLE 1

A culture medium of the following composition was prepared:

| | |
|---|---|
| Methanol | 35 ml. |
| (NH$_4$)$_2$SO$_4$ | 15 g. |
| KH$_2$PO$_4$ | 2 g. |
| MgSO$_4$ | 0.2 g. |
| NaCl | 0.5 g. |
| MnSO$_4$ | 0.008 g. |
| FeSO$_4$ | 0.01 g. |
| CaCO$_3$ | 25 g. |
| distilled water | 1 l. |
| pH | 7.0 |

Sixty ml. batches of the medium were poured into shaking flasks, sterilized, inoculated respectively with the strains listed in table 1, and aerobically cultured at 30° C. for 2 days. The results are shown in table 1.

Table 1

| Strain | L-glutamic acid, mg./l. |
|---|---|
| *Achromobacter methanolophila* E95-1 | 310 |
| *Achromobacter methanolophila* E91-1 | 350 |
| *Achromobacter methanolophilia* F48-3 | 100 |
| *Achromobacter methanolophila* E19-2 | 300 |
| *Achromobacter methanolophila* 73-1 | 300 |
| *Pseudomonas insueta* G8-3-2 FERM No. 84 (ATCC 21276) | 146 |
| *Pseudomonas insueta* G4-1-2 | 280 |
| *Pseudomonas insueta* F27-3 | 230 |

Approximately 94 percent of the glutamic acid present was recovered from each batch by conventional ion exchange methods.

EXAMPLE 2

A medium prepared as described in example 1 was supplemented with 0.2 g./l. yeast extract. Sixty ml. batches were inoculated with the micro-organisms listed in table 2 and cultured aerobically at 30° C. for 2 days. The amino acids newly formed in the fermentation broth were determined by bioassay, and the results are shown in table 2.

TABLE 2

| | Yield, mg./l. | | | | |
|---|---|---|---|---|---|
| Strain | Glutamic acid | Lysine | Glycine | Arginine | Phenylalanine |
| *Achromobacter methanolophila* F73-1 | | | | | 17 |
| *Pseudomonas insueta* G8-3-2 FERM No. 84 (ATCC 21276) | 466 | | 23 | 13 | |
| *Pseudomonas insueta* F27-3 | 335 | | | | 31 |
| *Pseudomonas insueta* G4-1-2 | 11.6 | | | | |

The amino acids were also recovered as described in example 1.

EXAMPLE 3

A medium was prepared as described in example 1 and supplemented with the following ingredients (per liter)

| | |
|---|---|
| thiamine-HCl | 1,000 micrograms |
| riboflavin | 1,000 micrograms |
| pyridoxine | 1,000 micrograms |
| Ca-panthotenate | 1,000 micrograms |
| nicotinic acid | 1,000 micrograms |
| p-amino-benzoic acid | 200 micrograms |
| biotin | 2 micrograms |
| folic acid | 50 micrograms |
| "Aji-eki" | 2 milliliters |

"Aji-eki" is a commercial soybean protein hydrolysate.

Batches of the medium were inoculated with the strains listed in table 3 and were cultured aerobically at 30° C. for 2 days. The results are shown in table 3.

TABLE 3

| Strain: | Yield of glumatic acid, mg./l. |
|---|---|
| *Achromobacter methanolophila* F54-2 FERM No. 83 (ATCC 21275) | 100 |
| *Achromobacter methanolophila* E95-1 | 605 |
| *Achromobacter methanolophila* E91-1 | 565 |
| *Achromobacter methanolophila* F36-1 | 90 |
| *Achromobacter methanolophila* E19-2 | 260 |
| *Achromobacter methanolophila* F73-1 | 270 |
| *Pseudomonas insueta* F27-3 | 425 |
| *Pseudomonas insueta* G8-3-2 FERM No. 84 (ATCC 21276) | 690 |

EXAMPLE 4

A medium was prepared as described in example 3, but (NH$_4$)$_2$SOB$_4$ was replaced by NH$_4$Cl (12 g./l.) as a nitrogen source, and the amounts of KH$_2$PO$_4$ and "Aji-eki" were increased to 7 g./l. and 6 ml./l. respectively. One hundred ml. of the medium were inoculated with *Pseudomonas insueta* G8-3-2 FERM No. 84 (ATCC 21276) and cultured on a shaker at 30° C.

After 3 days the broth was assayed, and an L-glutamic acid content of 2.46 g./l. was found. 2.31 g. glutamic acid were recovered per liter of broth as described above.

EXAMPLE 5

The strains listed in table 4 were inoculated into batches of the same medium as in example 3 which were aerobically cultured at 30° C. for 2 days. Each broth was assayed, and the amino acid contents listed in table 4 were found. The acids were also partly recovered by adsorption on ion exchange resin and sequential elution as is conventional.

Table 4

| Amino acids | Pseudomonas insueta F27-3 | Achromobacter methanolophila E-19-2 | Achromobacter methanolophila F73-1 |
| --- | --- | --- | --- |
| alanine | 145 mg./l. | | |
| isoleucine | 45 mg./l. | | 82 mg./l. |
| leucine | 125 mg./l. | | 171 mg./l. |
| threonine | 11 mg./l. | | 21 mg./l. |
| valine | | 314 mg./l. | |
| proline | 17 mg./l. | 23 mg./l. | |
| tyrosine | 19 mg./l. | 5 mg./l. | |

EXAMPLE 6

The strains listed in table 5 were aerobically cultured as described in example 3. Each broth was assayed and the amino acid contents listed in table 5 were found. A portion of each acid could be recovered.

TABLE 5

| Strain: | Yield, mg./l. |
| --- | --- |
| Achromobacter methanolophila F54-2 FERM No. 83 (ATCC 21275) | Alanine 187. |
| Achromobacter methanolophila F48-3 | Serine 81. |
| Pseudomonas insueta F27-3 | Valine 136. |

What is claimed is:

1. A method of producing an amino acid by fermentation which comprises culturing an amino acid producing strain of a micro-organism of the species *Achromobacter methanolophilia* or *Pseudomonas insueta* on a culture medium containing methanol as the principal source of assimilable carbon.

2. A method as set forth in claim 1 which further comprises recovering from said medium an amino acid selected from the group consisting of alanine, isoleucine, leucine, threonine, valine, proline, tyrosine, serine, lysine, glycine, arginine, phenylalanine and glutamic acid.

* * * * *